United States Patent
Aksit et al.

(10) Patent No.: US 6,435,514 B1
(45) Date of Patent: Aug. 20, 2002

(54) BRUSH SEAL WITH POSITIVE ADJUSTABLE CLEARANCE CONTROL

(75) Inventors: Mahmut Faruk Aksit; Osman Saim Dinc, both of Troy; Raymond Edward Chupp, Glenville; Ming Zhou, Schenectady, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/736,705

(22) Filed: Dec. 15, 2000

(51) Int. Cl.[7] .............................. F16J 15/44
(52) U.S. Cl. ........................................ 277/355
(58) Field of Search ............................ 277/355, 419

(56) References Cited

U.S. PATENT DOCUMENTS 5,603,510 A * 2/1997 Sanders ................... 277/413
5,971,400 A 10/1999 Turnquist et al. ......... 277/416
6,250,641 B1 * 6/2001 Dinc et al. ................ 277/355

* cited by examiner

*Primary Examiner*—Anthony Knight
*Assistant Examiner*—E Peavey
(74) *Attorney, Agent, or Firm*—Enrique Abarca; Donald S. Ingraham

(57) ABSTRACT

The positions of brush seal segments are positively adjusted relative to a housing carrying the brush seal segments and the opposing sealing component by employing members formed of thermally responsive material. The members are heated by heating elements receiving controlled power. By increasing or decreasing the power provided to the heating elements, the members are expanded or contracted to move the brush seal segments toward or away from the opposing sealing component.

11 Claims, 2 Drawing Sheets

BRUSH SEAL WITH POSITIVE ADJUSTABLE CLEARANCE CONTROL

BACKGROUND OF THE INVENTION

This invention relates generally to brush seals and more particularly to apparatus and methods for positively adjusting clearance between a brush seal and an opposing component against which the brush seal bears to form the seal.

Brush seals are commonly used to minimize leakage through a gap between parts or components which are to be sealed to one another. For example, brush seals are commonly used in rotating machinery such as steam and gas turbines used for power generation. Typically, the brush seals minimize leakage between regions at different pressures on opposite sides of the seal. As a specific example, a steam turbine may employ a brush seal for minimizing leakage of steam between a stationary component and a rotating component such as a rotor.

While brush seals are discussed herein in a preferred embodiment with respect to sealing between stationary and rotating components, it will also be appreciated that brush seals can be applied to seal components which are non-rotating and may be irregularly shaped. For example, a brush seal may be used to seal between a combustor transition piece and a sealing cap of a first stage nozzle in a gas turbine. In a typical application of a brush seal between stationary and rotating components, however, the brush seal comprises a plurality of arcuate segments, each segment conventionally including a pair of plates with a plurality of brush bristles disposed between the plates. The plates and proximal ends of the brush bristles between the plates are typically welded to one another, forming a completed brush seal segment. Opposite ends of the bristles project from between the plates, terminating in free ends or tips engaging and forming a seal with the other component, typically the rotating component. The arcuate brush seal segments are typically disposed in a groove of the stationary component and may have a spring between the component and the segment biasing the segment for movement between the opposing sealing components, e.g., for movement toward the rotating member.

It has been found, however, that because of stack-up tolerances and machine-to-machine variations, it is very difficult to achieve accurate clearance control, even with brush bristles biased by a spring toward the opposing sealing component. Also, it is common that for the same machine, the sealing clearance may be different from the bottom half to the upper half of the machine. For example, gravity affects the brush seal segments in the semi-circular upper and lower casings of a steam turbine tending to engage and disengage, respectively, the bristle tips relative to the rotor. These operating clearance variations result in performance changes in different applications. Additionally, brush seal leakage performance also tends to degrade with time and progressive bristle wear.

BRIEF SUMMARY OF THE INVENTION

In accordance with a preferred embodiment of the invention, an adjustable clearance brush seal is provided wherein the sealing clearance between the parts or components being sealed may be positively controlled, particularly during operation of the associated machine, and from locations external to the machine. For example, the brush seal may be provided in arcuate brush seal segments disposed in a groove of a stationary component with the bristles in opposition to, and engaging, the rotating component. The seal clearance between the bristles and the opposing component can be positively controlled. The seal clearance is the degree of interference between the brush bristles and the opposing sealing component, as well as any gap between the tips of the bristles and the associated sealing component, e.g., where it may be desired to maintain a gap permitting flow between opposite sides of the seal. To accomplish the foregoing, a member or members formed of a thermally expansible or contractible material are disposed in controlling relation to the brush seal in the component carrying the brush seal to control the location of the brush seal vis-a-vis the seal component engaged by the bristle tips. For example, each member may comprise one or more pins or sleeves carried by the stationary component and disposed in the groove between the stationary component and the brush seal to extend in a generally radial direction. Upon application of heat to the thermal material of the members, the members tend to elongate, displacing the brush seal segment radially toward the opposing seal component. Conversely, when the temperature of the members is lowered, any interference between the opposing seal component and the bristles of the brush seal tend to displace the brush seal segment in an opposite direction toward the component in which the brush seal is mounted. Consequently, the opposite ends of the members need not be secured to either the component or the brush seal. Alternatively, one or both ends of the members may be secured, for example, by welding, to the component mounting the brush seal and to the brush seal per se, whereby positive control of the brush seal can be effected to move the brush seal in opposite directions responsive to the differential heat applied to the members.

More particularly, and as noted previously, the members may comprise pins or hollow sleeves having heating elements about the pins or within the sleeves. The heating elements preferably comprise electrically actuated elements which can be controlled through suitable circuitry employing, for example, a rheostat. By adjusting the rheostat to control the magnitude of the heat supplied to the members, the members can be differentially expanded or contracted. A still further alternative may comprise a circumferentially extending member, e.g., a band, having a heating element contained within the band or about the band for expanding or contracting the band and, hence, displacing the brush seal segment toward or away from its opposing seal component.

The members are formed of materials having a high thermal coefficient of expansion and the electric heating elements may be embedded in or about the materials. By increasing or decreasing the power supplied to the heating elements, the pins or bands expand or contract, respectively, moving the seal segments toward or away from the opposing seal component, respectively. Consequently, the user may adjust the power setting to achieve the desired clearance. This also can be accomplished externally of the machine and while the machine is in operation. A particular advantage of the invention resides in elimination of a need for tight tolerances for the seal and its mounting, thereby easing machining constraints and reducing costs.

In a preferred embodiment of the invention, apparatus for adjusting a seal between two components includes a brush seal carried by one of the components for disposition between the two components and having a plurality of bristles projecting from the brush seal, with free ends of the bristles terminating in bristle tips in engagement with the other of the components forming a seal between the components. The brush seal is mounted for movement relative to one component and toward and away from the other component. A member disposed between the one component and the brush seal is responsive to heat either applied thereto or removed, by expanding or contracting, respectively, thereby displacing the brush seal relative to the one component toward or away from the other component, respectively.

In a further preferred embodiment, a rotary machine includes a rotatable component and a component fixed against rotation, the components being disposed about an axis, and a seal between the components comprising an arcuate brush seal segment carried by one of the components, including a plurality of bristles projecting from the one component and having free ends terminating in bristle tips in engagement with the other of the components, forming a seal between the components. The brush seal segment is mounted for movement relative to the one component and toward and away from the other component. A member is carried by the one component for displacing the brush seal segment relative to the other component and is formed of a material thermally responsive to heat applied differentially thereto by expanding or contracting and thus moving the brush seal relative to the one component, thereby adjusting the sealing clearance between the brush seal segment and the other component.

In a still further preferred embodiment of the invention there is provided in a seal between adjacent components including a brush seal carried by one of the components for movement relative to the one component toward and away from a second one of the components, the brush seal having a plurality of projecting bristles terminating in bristle tips in engagement with the second one of the components, a method of positively controlling the brush seal position relative to the one component comprising the steps of disposing a member between the brush seal and the one component which is formed of a thermally responsive material; and applying heat at different temperatures to the member of thermally responsive material to expand or contract the member and thereby move the brush seal relative to the one component and toward or away from the second component.

DETAILED DESCRIPTION OF THE INVENTION

Figure 1:
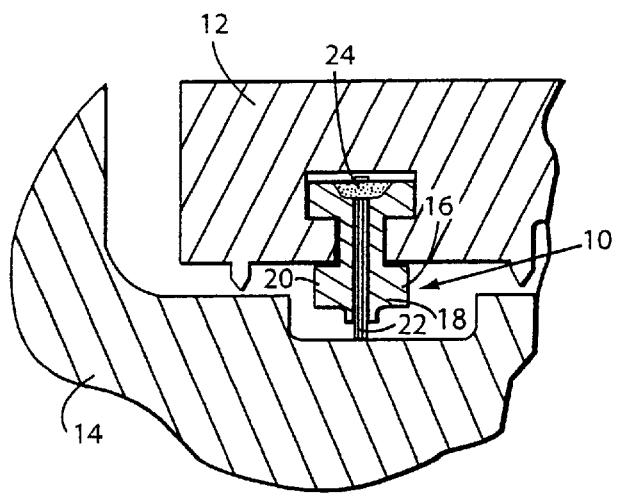
FIG. 1 is a fragmentary cross-sectional view of a brush seal between stationary and rotating components according to the prior art.
Figure 2:
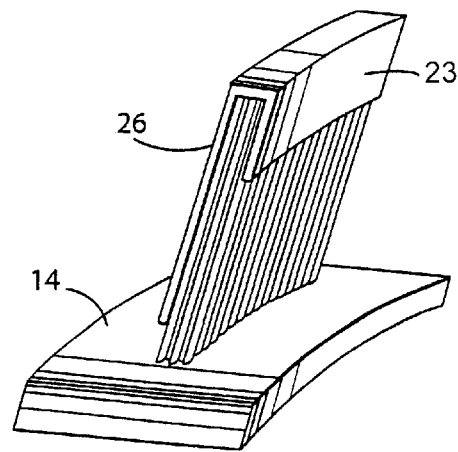
FIG. 2 is a perspective view of the brush seal illustrated in FIG. 1.

FIG. 1, illustrates a brush seal, 10, in accordance with the prior art, for sealing between a first component, e.g., a stationary component 12, and a second, rotatable component 14. Brush seal 10 comprises a plurality of arcuate segments 16, each having a pair of backing plates 18 and 20 enclosing therebetween a plurality of bristles 22. The bristles are secured at their proximal ends to the backing plates, for example, by welds 24. The bristles extend from their proximal ends between backing plates 18 and 20 to project freely therefrom, terminating in bristle tips in engagement with a surface of rotatable component 14. The bristles generally extend radially of the rotatable component and are offset from radii of that component generally in the direction of rotation. The bristles are formed of metal or may be formed of other material, such as ceramics. As shown in FIG. 2, one of the backing plates 23 extends to a lesser radial extent than the opposite backing plate 26. In the typical prior art brush seal configurations illustrated in FIGS. 1 and 2, the brush seal segment is disposed in a groove within stationary component 12 at a fixed radial location with the bristle tips engaging the sealing surface of rotatable component 14. Alternatively, the seal segment may be disposed in a groove within the stationary component and displaced under spring pressure toward or away from the rotating component. However, in both instances, the position of the brush seal is not achieved by positive control at the position or location of the brush seal segment.

Figure 3:
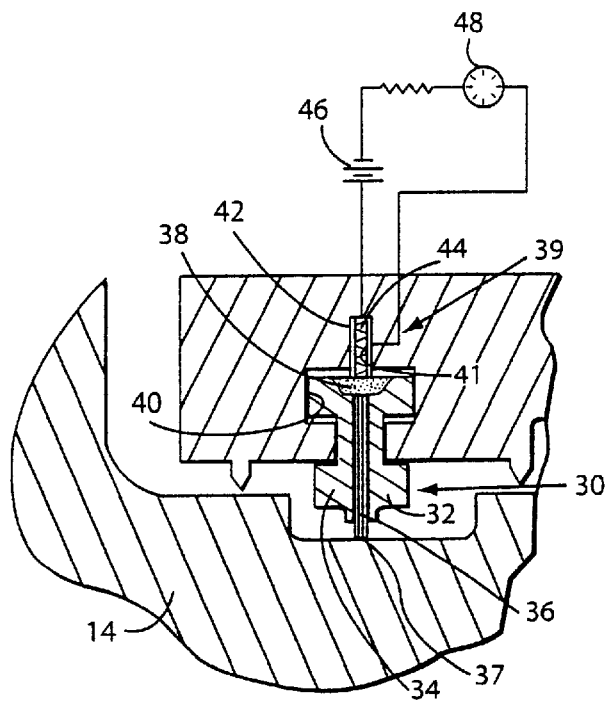
FIG. 3 is a fragmentary cross-sectional view illustrating a positive adjustable clearance brush seal according to a preferred embodiment of the invention and disposed between two components to be sealed.
Figure 4:
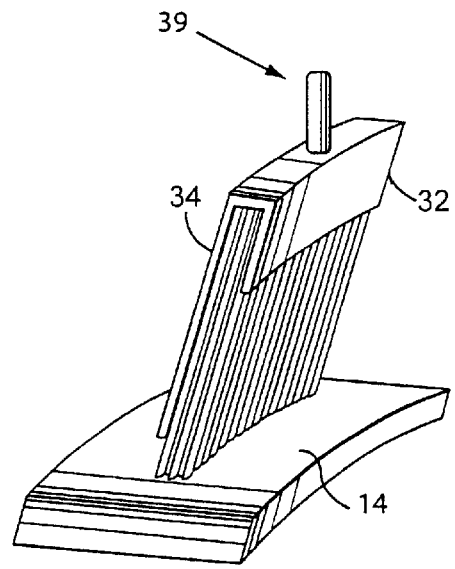
FIG. 4 is a perspective view similar to FIG. 2 illustrating a thermally responsive material in conjunction with a brush seal for positive clearance control according to a preferred embodiment of the invention.

In a preferred embodiment of the invention illustrated in FIGS. 3 and 4, each segment of a brush seal 30 comprises a pair of backing plates 32 and 34, with bristles 36 disposed therebetween. As in the prior art, the bristles are secured at their roximal ends between the backing plates by suitable means, for example, a weld 38. The bristles extend from the weld between the backing plates, terminating in bristle tips 37 in engagement with the surface to be sealed. contracts in the longitudinal direction of the long axis of the sleeve, which axis is oriented in a radial direction. For example, sleeve 41 may contain a heating element 44 connected in an electrical circuit including a power source 46 and a controller for adjusting the magnitude of the power supplied to heating element 44. The controller, for example, may comprise a rheostat 48. Alternatively, other types of controls can be us ed for controlling the power supplied to heating element 44 and hence the magnitude of the heat applied to sleeve 41. Moreover, while the heat applied to sleeve 41 is shown provided by an electrical heating element, other sources of heat may be used to expand o r contract the sleeve. For example, a fluid thermal medium, such as steam, may flow through or about the sleeve to expand the sleeve. A lower temperature fluid medium may also be used, such as a refrigerant, to contract the sleeve.

Figure 5:
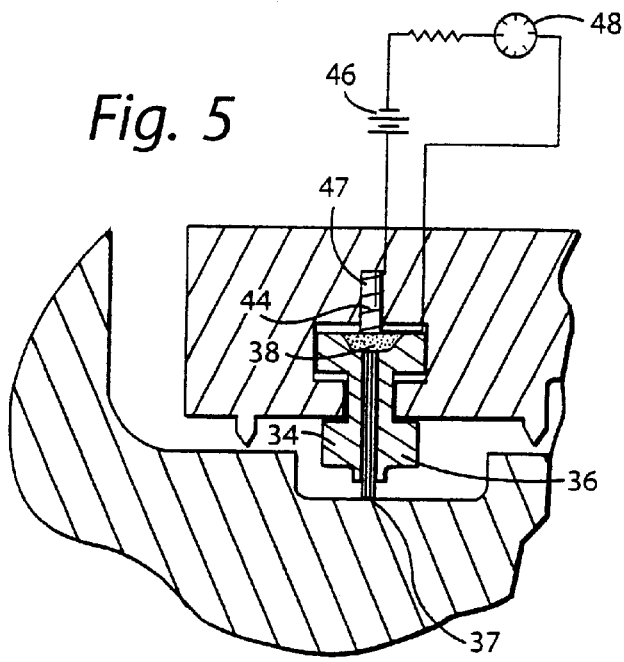
FIG. 5 is a view similar to FIG. 3 illustrating a further preferred embodiment of the invention.

While the embodiment of FIG. 3 illustrates heating element 44 residing within sleeve 41, member 39 may comprise a solid element, such as a pin 47 having heating element 44 disposed about the pin, as illustrated in FIG. 5. Other elements of the preferred embodiment hereof illustrated in FIG. 5 are denoted by like reference numerals as in the preceding embodiment.

By increasing or decreasing power supplied to the heating element , e.g. by adjusting rheostat 48, member 39 (or 47) is expanded or contracted, respectively, moving or displacing the seal segments in response thereto. For example, by increasing the power supplied to heating element 44 within sleeve 41 of FIG. 3, the sleeve is expanded in its axial direction and hence displaces the brush seal segment in a radial direction toward rotatable component 14. If the ends of the members are not secured to stationary component 12 or to the segments of brush seal 30, decreasing the power supplied to heating element 44 still positively controls the position of the brush seal segments because the engagement of rotatable component 14 with the bristle tips tends to displace the brush seal segments radially outwardly. Moreover, one or both ends of the members (e.g. sleeves 41 of FIG. 3 or pins 47 of FIG. 5) can be positively secured to the stationary component and/or the brush seal. In either instance, positive control over the location of the brush seal segments relative to the stationary component mounting the brush seal segments is achieved by increasing or decreasing power supplied to thermally expansible and contractible pins 47.

Figure 6:
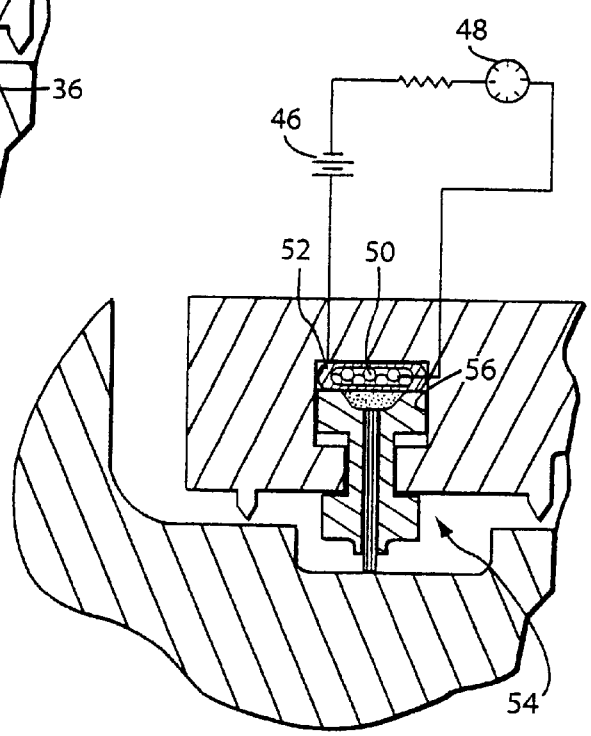
FIG. 6 is a view similar to FIG. 3 illustrating a still further preferred embodiment of the invention.

In another form of a preferred embodiment of the invention illustrated in FIG. 6, heating elements 50 may be disposed within a circumferentially extending member, e.g. a heating band 52, formed of a thermally responsive material. The heating band preferably resides in a space between brush seal segment 54 and the base of groove 56 in the stationary component. Thus, band 52 extends circumferentially between the brush seal segments and the base of groove 56, and may extend the entire circumferential length of the segments, or for only part of their length, or a plurality of band segments, separated from one another, may be provided along the circumference of the segments. Upon actuation of the heating elements within band 52, the increase or decrease of power supplied to the heating elements will respectively expand or contract band 52 in a radial direction to displace brush seal segments 54 in groove 56, thereby positively adjusting the clearance between the bristle tips and the surface of the rotatable component. One or both of the radially opposite faces of the heating bands may be secured to the stationary component and the power supplied to band 52 can be adjusted externally of the machine as in the preceding embodiment.

Figure 7:
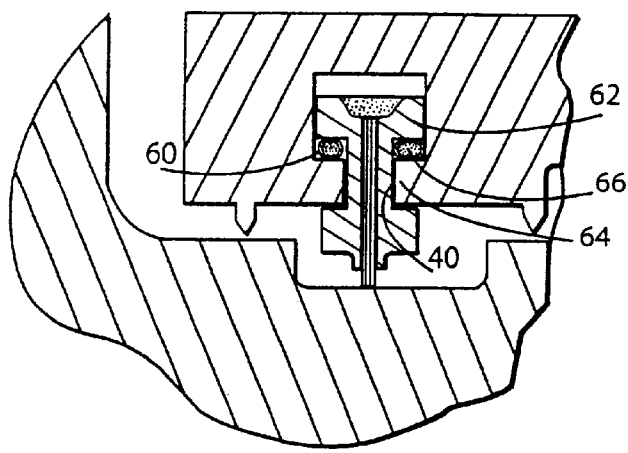
FIG. 7 is a view similar to FIG. 3 illustrating a further preferred embodiment of the invention.

In FIG. 7, a pair of bands 60, similar to band 52 shown in FIG. 6, are located between hook portions 62 of the brush seal segment and hooks 64 of groove 40. Heating elements 66 are disposed within bands 60 and each band, like bands 52 of FIG. 6, may extend in part or completely around the entire brush seal segment circumferentially. Consequently, upon increasing or decreasing power supplied to electrical elements 66, bands 52, formed of thermally expansible and contractible material, will expand or contract radially, respectively, causing the brush seal segments to move in a radial direction. The radially opposed faces of bands 60 may be secured to hooks 64 and hook portions 62, respectively. Alternatively, springs (not shown) may be disposed circumferentially about groove 40 to bias the segments for movement radially inwardly, the radial extent of bands 60 controlling the position of the brush seal segments against the bias of the spring.

It will be appreciated that the pins or bands need not be secured to either the stationary component or the brush seal in order to positively control the movement of the brush seal. For example, when the pin of FIG. 5 or the band of FIG. 6 is expanded, the brush seal is displaced radially inwardly. Upon decreasing the power supplied to the heating element, the pin or band contracts in a radial direction, providing a gap in which the interference between the rotating component and bristles forces the brush seal segment to move in a radially outward direction. The pins or bands, however, can be fixed at one end or along one face, respectively, to the stationary component or to the brush seal segment, or they can be fixed to both the stationary component and the brush seal segment at opposite ends or along opposite faces, respectively. With both ends or both faces fixed, the brush seal segment follows both the expanding and contracting movement of the pins or bands without external assist.

While only certain preferred features of the invention have been illustrated and described, many modifications and changes will occur to those skilled in the art. It is, therefore, to be understood that the appended claims are intended to cover all such modifications and changes as fall within the true spirit of the invention

What is claimed is:

1. Apparatus for minimizing fluid leakage between two components separated by a gap, comprising.

a brush seal carried by one of said components for disposition between the two components and including a plurality of bristles projecting from said brush seal and having free ends terminating in bristle tips in engagement with the other of said components so as to seal the gap between said components, said brush seal being mounted for movement relative to said one component and toward and away from said other component;

a member disposed between said one component and said brush seal and responsive to heat applied to said member so as to expand or contract, when heat is applied or removed, respectively, thereby displacing said brush seal relative to said one component toward or away from said another component, respectively;

a heating element for applying heat to said member wherein said heating element comprises an electrically actuated element; and a circuit for controllably energizing said electrically actuated heating element.

2. Apparatus according to claim 1 wherein said one component includes a groove therein for receiving at least part of said brush seal, said brush seal being movable in said groove toward and away from said other component, said member being disposed in said groove between said one component and said brush seal to expand or contract in response to the heat applied or removed, respectively, thereby displacing said brush seal relative to said one component.

3. Apparatus according to claim 1 wherein said member is fixed to a predetermined one of said components.

4. Apparatus according to claim 1 wherein said member is not secured to either of said components.

5. Apparatus according to claim 1 wherein said member is elongated in the direction of displacement of said brush seal.

6. Apparatus according to claim 1 wherein said member is elongated in a direction generally normal to the direction of displacement of said brush seal.

7. In a rotary machine having a rotatable component and a component fixed against rotation, said components being disposed about a common axis, apparatus for adjustably sealing a gap between said components, comprising:

an arcuate brush seal segment carried by one of said components, including a plurality of bristles projecting from said one component and having free ends terminating in bristle tips in engagement with the other of said components so as to seal the gap between said components, said brush seal segment being mounted for movement relative to said one component and toward and away from said other component;

a member carried by said one component for displacing said brush seal segment relative to said other component and formed of a material responsive to heat either applied to or removed from said member by expanding or contracting, respectively, and thereby moving said brush seal segment relative to said one component, so as to adjust clearance between said brush seal and said other component;

a heating element for heating said member; and a control for adjusting the magnitude of heat applied by said heating element to said member.

8. Apparatus according to claim 7 wherein said member is fixed at one end to said seal segment and at the other end to said one component, said member being responsive to the heat applied thereto or removed therefrom by expanding or contracting, respectively, to displace said one end of the member relative to said other end to move said brush seal segment relative to said one component.

9. Apparatus according to claim 7 wherein said heating element comprises an electrically actuated element, and said apparatus further including a circuit for controllably energizing said electrically actuated heating element.

10. A method of positively controlling a brush seal position relative to one of two components separated by a gap therebetween, said brush seal being carried by said one of said components for movement toward and away from the other of said components, said brush seal having a plurality of bristles projecting therefrom and terminating in bristle tips in engagement with said other of said components, said method comprising the steps of:

disposing a member between said brush seal and said one component, said member being formed of a thermally responsive material;

applying heat at different temperatures to said thermally responsive member to expand or contract said member and thereby move said brush seal relative to said one component and toward or away from said other component; and affixing an electrically energized heating element to said member, and controlling power provided to said heating element to heat said member to the specified temperatures.

11. A method according to claim 10 wherein said one component includes a groove therein for receiving the brush seal, and further including the step of disposing said member in said groove between said brush seal and said one component.

* * * * *